2 Sheets--Sheet 1.

M. HALLENBECK.

Improvement in Harvesters.

No. 4,960. Reissued July 2, 1872.

Witnesses:

T. C. Brecht.

W. H. Rowe.

Inventor:

Martin Hallenbeck by his Atty

Wm. G. Baldwin

2 Sheets--Sheet 2.

M. HALLENBECK.

Improvement in Harvesters.

No. 4,960. Reissued July 2, 1872.

Witnesses:

T. C. Brecht.

W. H. Rowe.

Inventor:

Martin Hallenbeck by his Atty

W. V. Baldwin

UNITED STATES PATENT OFFICE.

MARTIN HALLENBECK, OF PHILLIPSBURG, NEW JERSEY, ASSIGNOR TO ALFRED BLAKER.

IMPROVEMENT IN HARVESTERS.

Specification forming part of Letters Patent No. 27,901, dated April 17, 1860; reissue No. 4,960, dated July 2, 1872.

*To all whom it may concern:*

Be it known that I, MARTIN HALLENBECK, formerly of Albany, New York, now of Phillipsburg, New Jersey, have invented certain new and useful Improvements in Harvesters, of which the following is a specification:

My invention relates to harvesters of that class known as "front-cut," "hinged-bar" machines. Its objects are to enable the machine to conform to irregularities of the surface over which it glides; to regulate the height of cut; to allow the finger-beam to rise and fall freely at either end, or to rock axially in its bearings, and firmly to brace the finger-beam and shoe to enable them to resist lateral strains.

The subject-matter claimed is fully specified hereinafter.

The accompanying drawing represents so much of a machine, in which all my improvements are embodied, as is necessary to illustrate the subject-matter hereinafter claimed; obviously, however, some of these improvements may be used without the others, and in machines differing in some respects from that therein represented.

Figure 1:
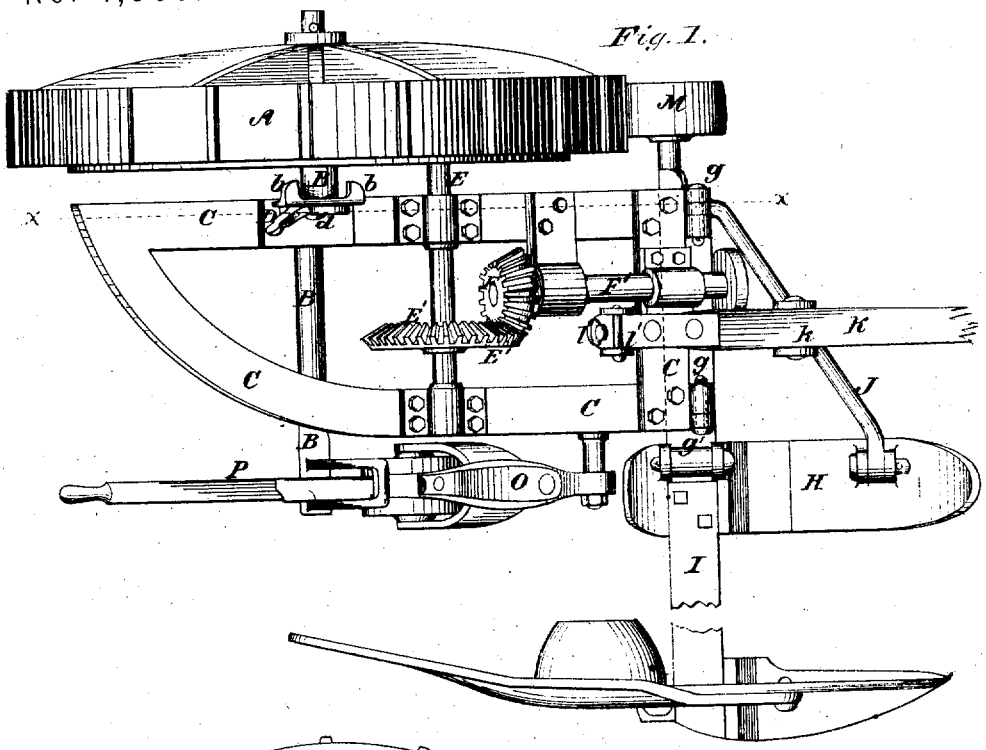
Figure 2:
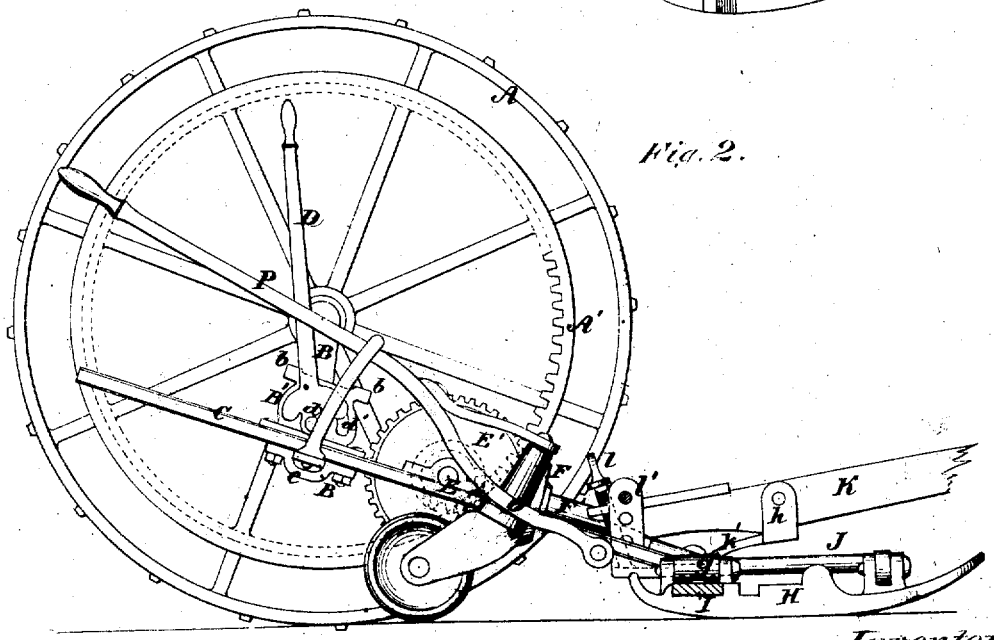
Figure 3:
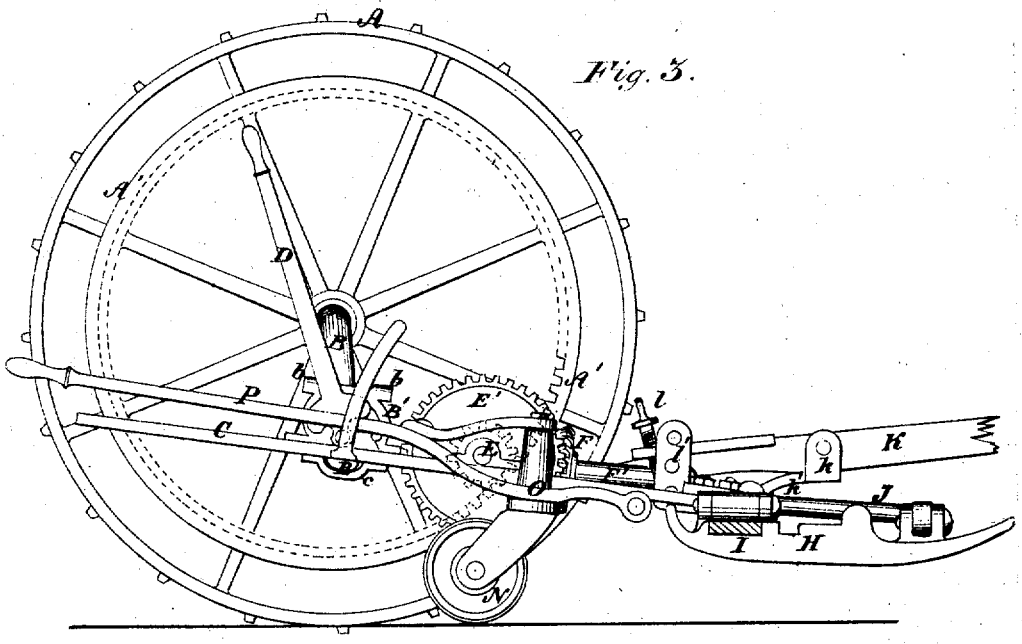
Figure 4:
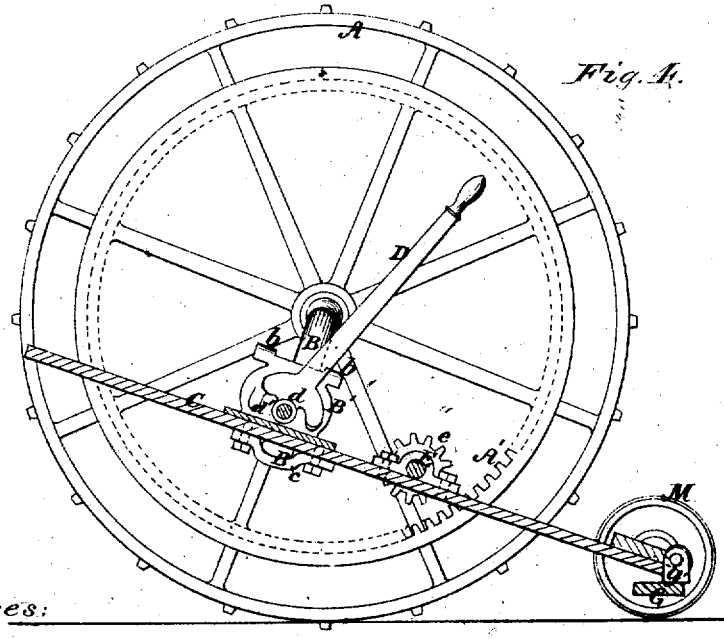

Figure 1 represents a plan of my improved machine; Fig. 2, a side elevation thereof, with the finger-beam in section and the shoe resting on the ground; Fig. 3, a similar view with the shoe elevated; Fig. 4, a longitudinal section through the main frame at the line *x x* of Fig. 1.

A main driving-wheel, A, is shown as mounted on a cranked axle, B, rocking, but not revolving, in bearings *c* in a main frame, C. A stand, B′, on the frame, is provided with lugs *b*, between which the cranked part of the axle vibrates, and by which its movements are limited. The axle is vibrated by means of a lever, D, pivoted at *d* to the stand B′, and provided with lugs, which play in the curved slots *d′* in the standard. An internal spur-gear, A, on the driving-wheel A, drives a spur-pinion, *e*, on a shaft, E, mounted in suitable boxes in the main frame, and carrying a bevel-wheel, E′, which drives a corresponding gear, F, on a crank-shaft, F′, which drives the cutters, as usual, by a crank and pitman. The mechanism is thrown into or out of gear by vibrating the crank-axle B by means of the lever D, which vibration moves the gear A′ on the driving-wheel toward or from the pinion on the countershaft. Figs. 1, 2, and 3 show the mechanism in gear. Fig. 4 shows it out of gear. A coupling-arm, G, rocks axially in bearings *g* on the front of the main frame. (See Fig. 4.) A shoe, H, is pivoted to this coupling-arm by a hinge, *g′*, in the usual way. and a finger-beam, I, is likewise secured to this shoe in the line of the coupling-arm, so as to partake both of the axially-rocking movement of the coupling-arm, and of the rocking movement of the shoe on its hinge transverse to that of the coupling-arm. A brace, J, is attached to the coupling-arm at one end, and at the other is pivoted to the shoe concentrically with the hinge which connects the shoe and coupling arm. By this mode of construction the shoe projects in advance of the frame; is firmly braced against lateral strain, while free to rock or roll on its hinges; it can also lift the points of the guards when it rides over an obstacle, and also elevate the front end of the main frame. I am thus enabled to run with the front end of the main frame close to the ground. The tongue K is pivoted at *k* to an arm or bracket, *k′*, projecting from the coupling-arm. The rear end of the tongue projects behind the coupling-arm, and is provided with a set-screw, *l*, which bears against a projection on the back of the coupling-arm. By this construction the ascent of the front end of the tongue may at once cause the finger-beam to rock, or a limited amount of play may be allowed without rocking it. The descent of the front end of the shoe and the points of the guards below a given point is also prevented, as will readily be seen. The descent of the front end of the tongue is limited by a pin passing through holes in a loop, *l′*, likewise secured upon the coupling-arm. Thus it will be seen that by my improvement the rocking coupling-arm not only constitutes the connection between the main frame and the shoe, the brace, and the tongue, but a pivot on which they rock; and the tendency of the pull of the team is constantly to lighten the draft by lifting the front end of the main frame, and with it the shoe and finger-beam. A small wheel or roller, M, mounted on an arm projecting from the outer end of the coupling-arm serves to support the frame. A caster-wheel, N, mounted on an arm, O, pivoted to the main frame and acted upon by a lever, P, supports the inner side of the frame and serves to lift the finger-beam when required.

My improvements are to be used on a fully-organized machine, the details of construction of which, being familiar, need no description here. The operation of the machine will readily be understood from the foregoing description.

I claim as my invention—

1. The combination of a main frame vibrating on the main axle, a coupling-arm rocking axially in bearings in the front of the frame, and a shoe hinged to the coupling-arm and projecting in front of the frame, substantially as set forth.

2. The combination of a vibrating main frame, a coupling-arm rocking axially in bearings in the front end of the frame, a shoe hinged to the coupling-arm, and a brace attached at one end to the rocking coupling-arm, and at the other pivoted to the shoe concentrically with the hinge of the shoe, substantially as set forth.

3. The combination of an axially-rocking hinged finger-beam with a tongue pivoted directly to the coupling-arm, on which the finger-beam rocks, substantially as set forth.

4. The combination of an axially-rocking finger-beam, a tongue pivoted to a coupling-arm, on which the finger-beam rocks, and a stop to limit the rocking of the tongue and finger-beam, substantially as set forth.

MARTIN HALLENBECK.

Witnesses:
LEWIS C. REESE,
GEO. M. DAVIS.